United States Patent
Wu

(10) Patent No.: US 10,667,317 B2
(45) Date of Patent: May 26, 2020

(54) BASE STATION AND METHOD OF HANDLING SECONDARY CELL GROUP CONFIGURATION IN SECONDARY NODE CHANGE

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/568,163

(22) Filed: Sep. 11, 2019

(65) Prior Publication Data
US 2020/0008256 A1 Jan. 2, 2020

Related U.S. Application Data

(62) Division of application No. 16/001,961, filed on Jun. 7, 2018.

(Continued)

(51) Int. Cl.
| | |
|---|---|
| *H04W 4/00* | (2018.01) |
| *H04W 76/15* | (2018.01) |
| *H04W 76/27* | (2018.01) |
| *H04J 11/00* | (2006.01) |
| H04W 88/06 | (2009.01) |
| H04W 72/04 | (2009.01) |
| H04W 36/00 | (2009.01) |

(52) U.S. Cl.
CPC ......... *H04W 76/15* (2018.02); *H04J 11/0076* (2013.01); *H04W 76/27* (2018.02); *H04W 36/0069* (2018.08); *H04W 72/0413* (2013.01); *H04W 88/06* (2013.01)

(58) Field of Classification Search
CPC . H04W 76/15; H04W 76/27; H04W 72/0413; H04W 88/06
See application file for complete search history.

(56) References Cited

U.S. PATENT DOCUMENTS

| 9,801,225 B2 | 10/2017 | Jha |
| 2015/0264562 A1 | 9/2015 | Wu |

(Continued)

FOREIGN PATENT DOCUMENTS

| EP | 3041310 A1 | 7/2016 |
| JP | 2020-31250 A | 2/2020 |
| WO | 2016/021821 A1 | 2/2016 |

OTHER PUBLICATIONS

Nokia et al. (R3-172014, of May 15-17, 2017, Figure 10.4 (Year: 2017).*

(Continued)

*Primary Examiner* — Maharishi V Khirodhar
(74) *Attorney, Agent, or Firm* — Winston Hsu

(57) ABSTRACT

A first base station is configured to execute instructions of the first BS receiving a first interface message for a communication device from a second BS; the first BS transmitting a second interface message to the second BS in response to the first interface message, wherein the second interface message comprises a secondary cell group configuration and an information element causing the first BS to comprise an indication indicating release of SCG in a radio resource control message; and the first BS transmitting the RRC message to the communication device, wherein the RRC message comprises the SCG configuration and the indication.

8 Claims, 7 Drawing Sheets

Related U.S. Application Data

(60) Provisional application No. 62/660,260, filed on Apr. 20, 2018, provisional application No. 62/570,644, filed on Oct. 10, 2017, provisional application No. 62/520,575, filed on Jun. 16, 2017, provisional application No. 62/516,662, filed on Jun. 7, 2017.

(56) References Cited

U.S. PATENT DOCUMENTS

| | | |
|---|---|---|
| 2015/0271726 A1 | 9/2015 | Kim |
| 2016/0212662 A1* | 7/2016 | Lee .................. H04W 76/34 |
| 2016/0278073 A1 | 9/2016 | Dinan |
| 2016/0373972 A1* | 12/2016 | Vesely ............. H04W 36/0033 |
| 2017/0222876 A1 | 8/2017 | Van Der Velde |
| 2017/0303286 A1* | 10/2017 | Sang .................. H04W 76/15 |
| 2018/0049214 A1 | 2/2018 | Kubota |
| 2018/0288826 A1* | 10/2018 | Chiba ................. H04W 76/15 |
| 2018/0295670 A1* | 10/2018 | Decarreau .......... H04W 76/38 |
| 2018/0332494 A1* | 11/2018 | Hou .................. H04W 28/08 |
| 2019/0261235 A1* | 8/2019 | Yilmaz ............ H04W 36/0027 |
| 2019/0313309 A1 | 10/2019 | Tsuboi |

OTHER PUBLICATIONS

3GPP TS 36.423 V14.2.0, Mar. 2017, p. 52, section 8.6.5.2. (Year: 2017).*
3GPP TS 36.331 V15.0.0 (Dec. 2017) Technical Specification, 3rd Generation Partnership Project; Technical Specification Group Radio Access Network; Evolved Universal Terrestrial Radio Access (E-UTRA); Radio Resource Control (RRC); Protocol specification (Release 15).
3GPP TS 37.340 V0.4.0 (Aug. 2017) Technical Specification, 3rd Generation Partnership Project; Technical Specification Group Radio Access Network; Evolved Universal Terrestrial Radio Access (E-UTRA) and NR; Multi-connectivity; Stage 2 (Release 15).
3GPP TS 37.340 V15.0.0 (Dec. 2017) Technical Specification, 3rd Generation Partnership Project; Technical Specification Group Radio Access Network; Evolved Universal Terrestrial Radio Access (E-UTRA) and NR; Multi-connectivity; Stage 2 (Release 15).
3GPP TS 38.331 V15.0.0 (Dec. 2017) Technical Specification, 3rd Generation Partnership Project; Technical Specification Group Radio Access Network NR; Radio Resource Control (RRC) protocol specification (Release 15).
3GPP TS 38.401 V15.0.0 (Dec. 2017) Technical Specification 3rd Generation Partnership Project; Technical Specification Group Radio Access Network; NG-RAN; Architecture description (Release 15).
3GPP TS 38.473 V15.0.0 (Dec. 2017) Technical Specification 3rd Generation Partnership Project; Technical Specification Group Radio Access Network; NG-RAN; F1 application protocol (F1AP) (Release 15).
GPP TSG-RAN WG2 Meeting #98, R2-1704659, Hangzhou, China, May 15-19, 2017, Title: Initial Stage 2 TP for EN-DC procedures, Source: ZTE Corporation, Agenda item: 10.2.3, Document for: Discussion and Decision.
3GPP TSG-RAN WG2 Meeting #98, R2-1705415, Hangzhou, China, May 15-19, 2017, Title: Initial stage2 TP for MN/SN procedures for MR-DC with 5GC, Source: ZTE Corporation, Agenda item: 10.2.3, Document for: Discussion and Decision.
3GPP TSG-RAN WG2#99bis, R2-1711666, Prague, Czech Republic, Oct. 9-13, 2017, Revision of R2-1709407, Agenda Item: 10.2.7, Source: HTC, MediaTek, Title: Support of full configuration per CG, Document for: Discussion and decision.
Search Report dated Sep. 21, 2018 for EP application No. 18176499.4, pp. 1-5.
Nokia, Alcatel Lucent Shanghai Bell, ZTE, "Description of EN-DC procedures", 3GPP TSG-RAN WG3 Meeting #96, R3-172014, May 15-17, 2017, Hangzhou, P.R.China, XP051286158, pp. 1-14.
Ericsson, "Procedure for secondary node change", 3GPP TSG-RAN WG2 #97, Tdoc R2-1700920, Feb. 13-17, 2017, Athens, Greece, pp. 1-4.
Office action dated Mar. 8, 2019 for the Taiwan application No. 107119704, filed Jun. 7, 2018, p. 1-12.
Title of Invention: Method and apparatus of S-NB mobility for NR, U.S. Appl. No. 62/374,807, Aug. 13, 2016.
Office action dated Dec. 9, 2019 for the U.S. Appl. No. 16/576,782, filed Sep. 20, 2019, pp. 1-16.
Office action dated Sep. 16, 2019 for the U.S. Appl. No. 16/001,961, filed Jun. 7, 2018, p. 1-20.
Office action dated Jan. 13, 2020 for the U.S. Appl. No. 16/001,961, filed Jun. 7, 2018, pp. 1-21.
Office action dated Mar. 23, 2020 for the U.S. Appl. No. 16/576,782, filed Sep. 20, 2019, p. 1-17.

\* cited by examiner

BASE STATION AND METHOD OF HANDLING SECONDARY CELL GROUP CONFIGURATION IN SECONDARY NODE CHANGE

CROSS REFERENCE TO RELATED APPLICATIONS

This application is a divisional application of U.S. application Ser. No. 16/001,961, filed on Jun. 7, 2018. The U.S. application Ser. No. 16/001,961 claims the benefits of U.S. Provisional Application No. 62/516,662 filed on Jun. 7, 2017, and U.S. Provisional Application No. 62/520,575 filed on Jun. 16, 2017, U.S. Provisional Application No. 62/570,644 filed on Oct. 10, 2017, and U.S. Provisional Application No. 62/660,260 filed on Apr. 20, 2018, which are incorporated herein by reference.

BACKGROUND OF THE INVENTION

1. Field of the Invention

The present invention relates to a base station and a method used in a wireless communication system, and more particularly, to a base station and a method of handling a secondary cell group configuration in a secondary node change.

2. Description of the Prior Art

In 3rd Generation Partnership Project (3GPP), a next generation cellular system called a new radio (NR) system or a fifth generation (5G) system is recently developed.

SUMMARY OF THE INVENTION

The present invention therefore provides a method and related communication device for handling a secondary cell group configuration in a secondary node change.

A first base station (BS) comprises at least one storage device, and at least one processing circuit, coupled to the at least one storage device. The at least one storage device stores, and the at least one processing circuit is configured to execute instructions of: the first BS receiving a first interface message for a communication device from a second BS; the first BS transmitting a second interface message to the second BS in response to the first interface message, wherein the second interface message comprises a secondary cell group (SCG) configuration and an information element (IE) causing the first BS to comprise an indication indicating release of SCG in a radio resource control (RRC) message; and the first BS transmitting the RRC message to the communication device, wherein the RRC message comprises the SCG configuration and the indication.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
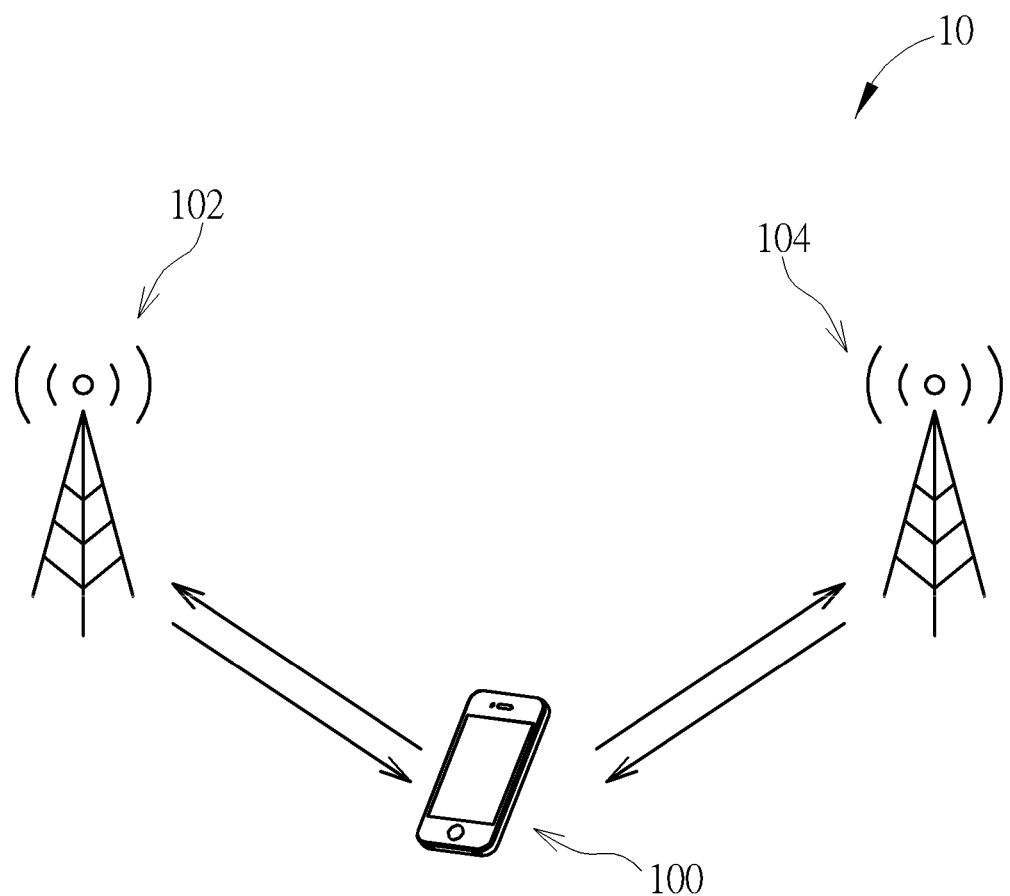
FIG. 1 is a schematic diagram of a wireless communication system according to an example of the present invention.

FIG. 1 is a schematic diagram of a wireless communication system 10 according to an example of the present invention. The wireless communication system 10 is briefly composed of a communication device 100, a base station (BS) 102 and a BS 104. In FIG. 1, the communication device 100, the BS 102 and the BS 104 are simply utilized for illustrating the structure of the wireless communication system 10.

As shown in FIG. 1, the communication device 100 may be configured to simultaneously connect to the BSs 102 and 104 (i.e., dual connectivity (DC)). That is, the communication device 100 in the DC may perform a transmission/reception via both the BSs 102 and 104. For example, the communication device 100 may receive packets from the BS 102 at a first carrier frequency and the BS 104 at a second carrier frequency, or the communication device 100 may transmit packets to the BS 102 at a first carrier frequency and the BS 104 at a second carrier frequency. In addition, one of the BSs 102 and 104 may be a master node (MN) and the other BS may be a secondary node (SN). The first carrier frequency and the second carrier frequency may or may not be overlapped.

The communication device 100 may be a user equipment (UE), a mobile phone, a laptop, a tablet computer, an electronic book, a portable computer system, a vehicle or an airplane. In addition, for an uplink (UL), the communication device 100 is a transmitter and the BS(s) 102 and/or 104 is a receiver(s), and for a downlink (DL), the BS(s) 102 and/or 104 is a transmitter(s) and the communication device 100 is a receiver.

Figure 2:
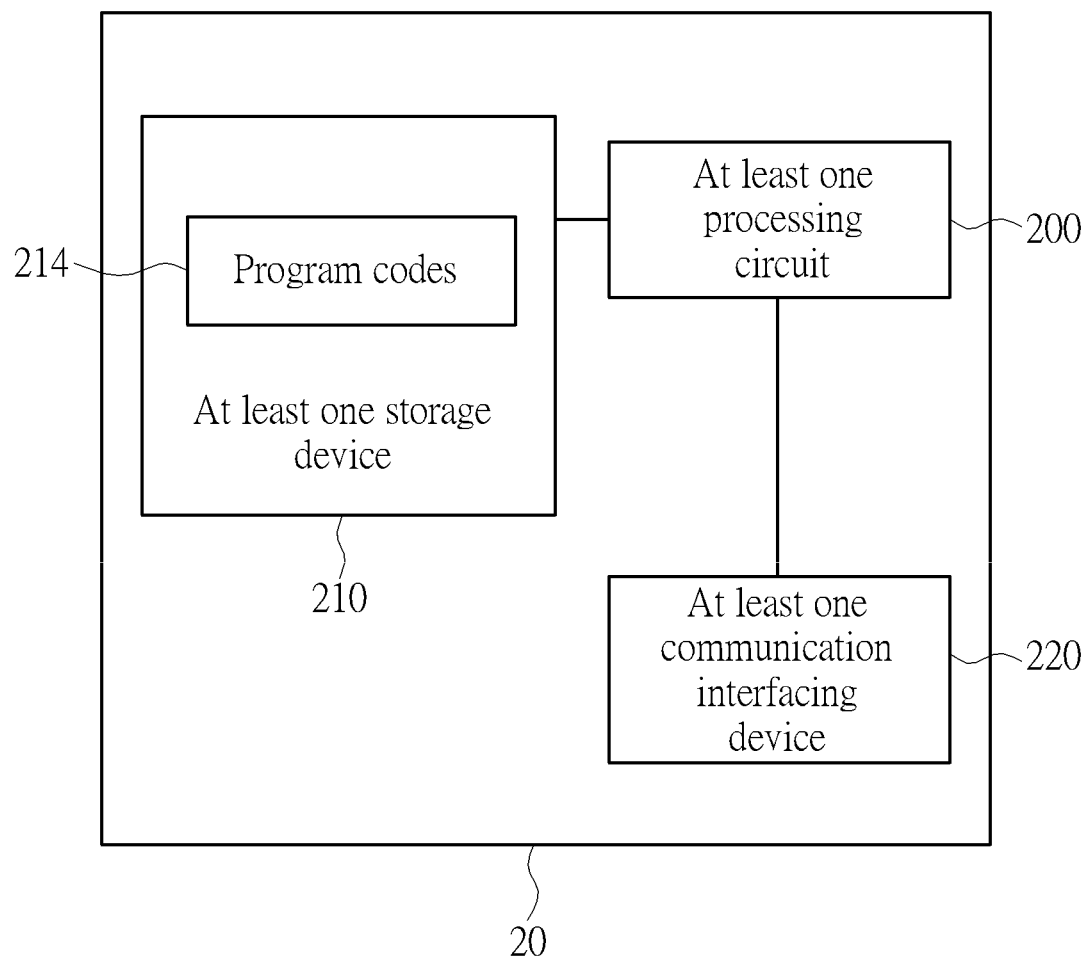
FIG. 2 is a schematic diagram of a communication device according to an example of the present invention.

FIG. 2 is a schematic diagram of a communication device 20 according to an example of the present invention. The communication device 20 may be the communication device 100, the BS(s) 102 and/or 104 shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used for representing the communication device 100 in FIG. 1, to simplify the illustration of the embodiments.

There are two cases that a delta configuration cannot be performed in a change of SN procedure (e.g., a SN for the UE is changed from a source SN to a target SN) which may be initiated by a MN or by the source SN. One case is that a target SN may not comprehend a configuration configured by a source SN. The target SN may reject a SN Addition Request message received from the MN in this case. The other case is that the source SN and the target SN may not belong to the same vendor. The target SN does not want to reuse any configuration configured by the source SN but has no means to perform a full configuration. In this case, the target SN may also reject the SN Addition Request message. In the both cases, the MN may need to configure the UE to release a secondary cell group (SCG). That is, the UE is not configured in DC anymore and is only configured to connect to the MN, i.e. only the connection with the MN is kept.

Figure 3:
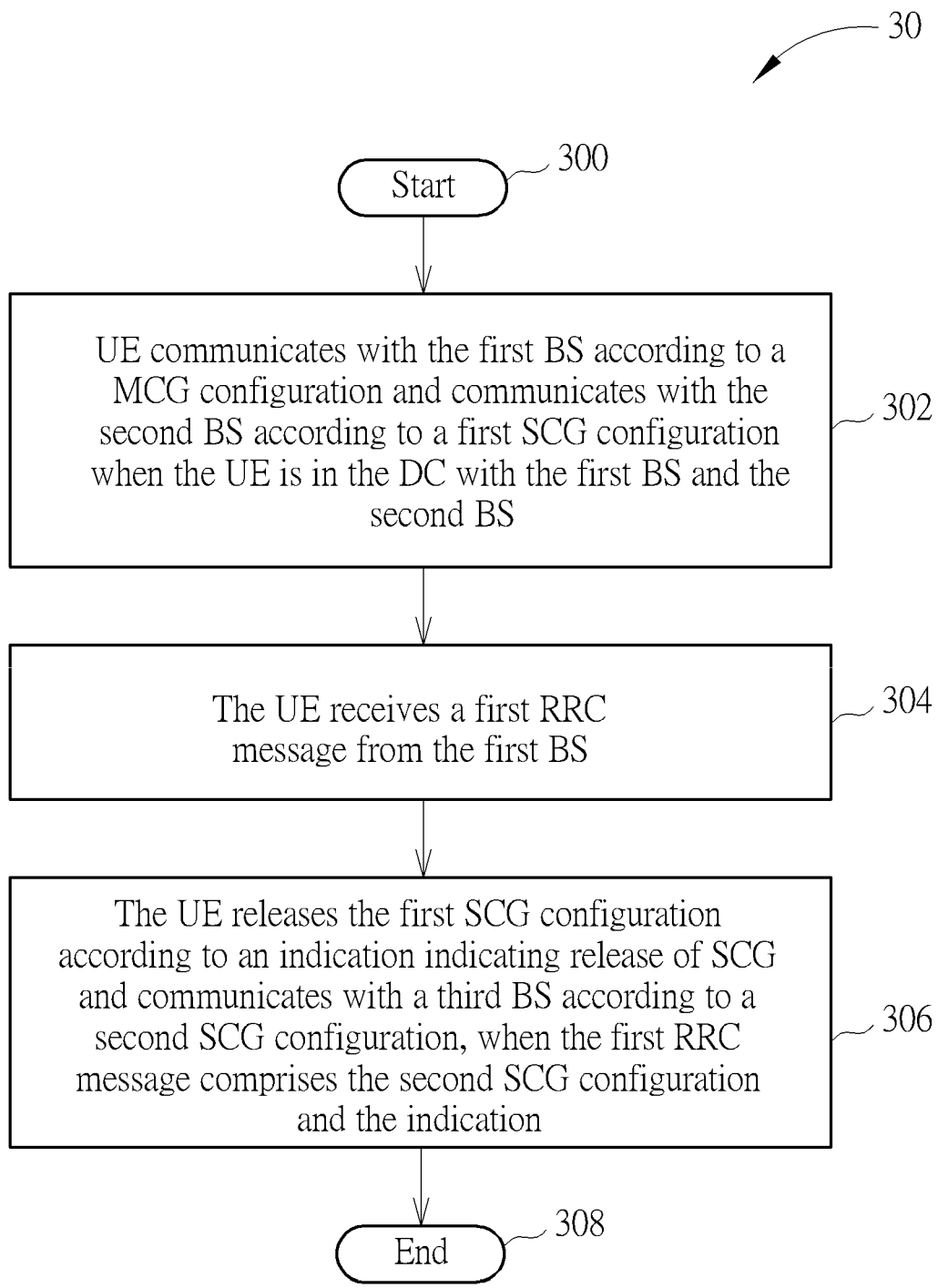
FIG. 3 is a flowchart of a process according to an example of the present invention.

A process 30 in FIG. 3 may be utilized in a UE, and includes the following steps:

Step 300: Start.

Step 302: The UE communicates with a first BS according to (e.g., using) a master cell group (MCG) configuration and communicates with a second BS according to a first SCG configuration when the UE is in the DC with the first BS and the second BS.

Step 304: The UE receives a first radio resource control (RRC) message from the first BS.

Step 306: The UE releases the first SCG configuration according to an indication indicating release of SCG (e.g., SCG release or SN release) and communicates with a third BS according to a second SCG configuration, when the first RRC message comprises the second SCG configuration and the indication.

Step 308: End.

In one example, the UE keeps (e.g., maintains or does not release) at least one configuration of a plurality of configurations comprised in the first SCG configuration and communicates with the third BS according to the at least one configuration and the second SCG configuration, when the first RRC message does not include the indication and includes the second SCG configuration.

In one example, the second SCG configuration comprises a plurality of configurations. In one example, the second SCG configuration includes at least one first configuration and does not include at least one second configuration in the first SCG configuration. The second SCG configuration may not include a release indication indicating release of the at least one configuration.

In one example, the second SCG configuration may configure a SN change from the second BS to the third BS. In response to the SN change, the UE connects to the third BS instead of the second BS, while connecting to the first BS. That is, the UE simultaneously connects to the first BS and the third BS.

In one example, the MCG configuration, the first SCG configuration and/or the second SCG configuration includes at least one of a frame structure configuration, a physical cell identity (PCI), carrier information, a temporary identifier (e.g., Cell Radio Network Temporary Identifier (C-RNTI)) assigned to the UE, a physical layer configuration (e.g., for physical channel(s), a transmission mode, beamforming, a reference signal, a channel state information reporting, a subframe configuration, a slot configuration, etc.), a medium access control (MAC) configuration and at least one radio bearer (RB) configuration.

In one example, the at least one RB configuration includes a SRB configuration and/or a DRB configuration. Each of the at least one RB configuration may include at least one of a RB identity, an EPS bearer identity, a PDU session identity and a radio link control (RLC) configuration. The DRB configuration may configure a SCG part of a DRB (e.g., MCG split bearer), a DRB of a SCG bearer or a DRB of a SCG split bearer. The RB configuration may or may not include a Packet Data Convergence Protocol (PDCP) configuration. The at least one configuration in the first SCG configuration may include configuration(s) in the first SCG configuration described above.

In one example, the UE releases the first SCG configuration in response to the indication. The UE communicates with the first BS according to the MCG configuration and communicates with the third BS according to the second SCG configuration.

In one example, when the first RRC message does not include the indication and includes the second SCG configuration, the second SCG configuration includes change(s) to update one or more configuration(s) in the first SCG configuration. For example, the first SCG configuration includes a first configuration (which has a first value) and a second configuration. The second SCG configuration may include a second value of the first configuration, but the second SCG configuration does not include the second configuration. Thus, the UE updates the first value of the first configuration to the second value (i.e., use the second value of the second SCG configuration instead of the first value) and keeps using the second configuration in the first SCG configuration, when receiving/in response to the second SCG configuration.

In one example, the first SCG configuration includes a first configuration (which has a first value) and a second configuration. The first RRC message includes the second SCG configuration and the indication. The second SCG configuration may include a second value of the first configuration but does not include the second configuration. Thus, the UE uses the second value for the first configuration and releases the second configuration in the first SCG configuration in response to the indication. Thus, the UE does not use the second configuration, when receiving/in response to the indication.

In one example, the UE replaces the first SCG configuration with the second SCG configuration, when the first RRC message includes the indication and the second SCG configuration. The UE releases the first SCG configuration and use the second SCG configuration in response to the indication. In one example, DRB(s) configured by DRB configuration(s) in the first SCG configuration may be configured by DRB configuration(s) in the second SCG configuration. In one example, the UE releases the DRB(s) configured by the DRB configuration(s) in the first SCG configuration and add the DRB(s) configured by the DRB configuration (s) in the second SCG configuration. In one example, the UE reconfigures or modifies the DRBs according to (e.g., using) the DRB configuration(s) in the second SCG configuration.

In one example, the UE releases the first SCG configuration (i.e., releases the connection with the second BS), when the first RRC message includes the indication but does not include the second SCG configuration. The UE is no longer in the DC, and only connects to the first BS.

Figure 4:
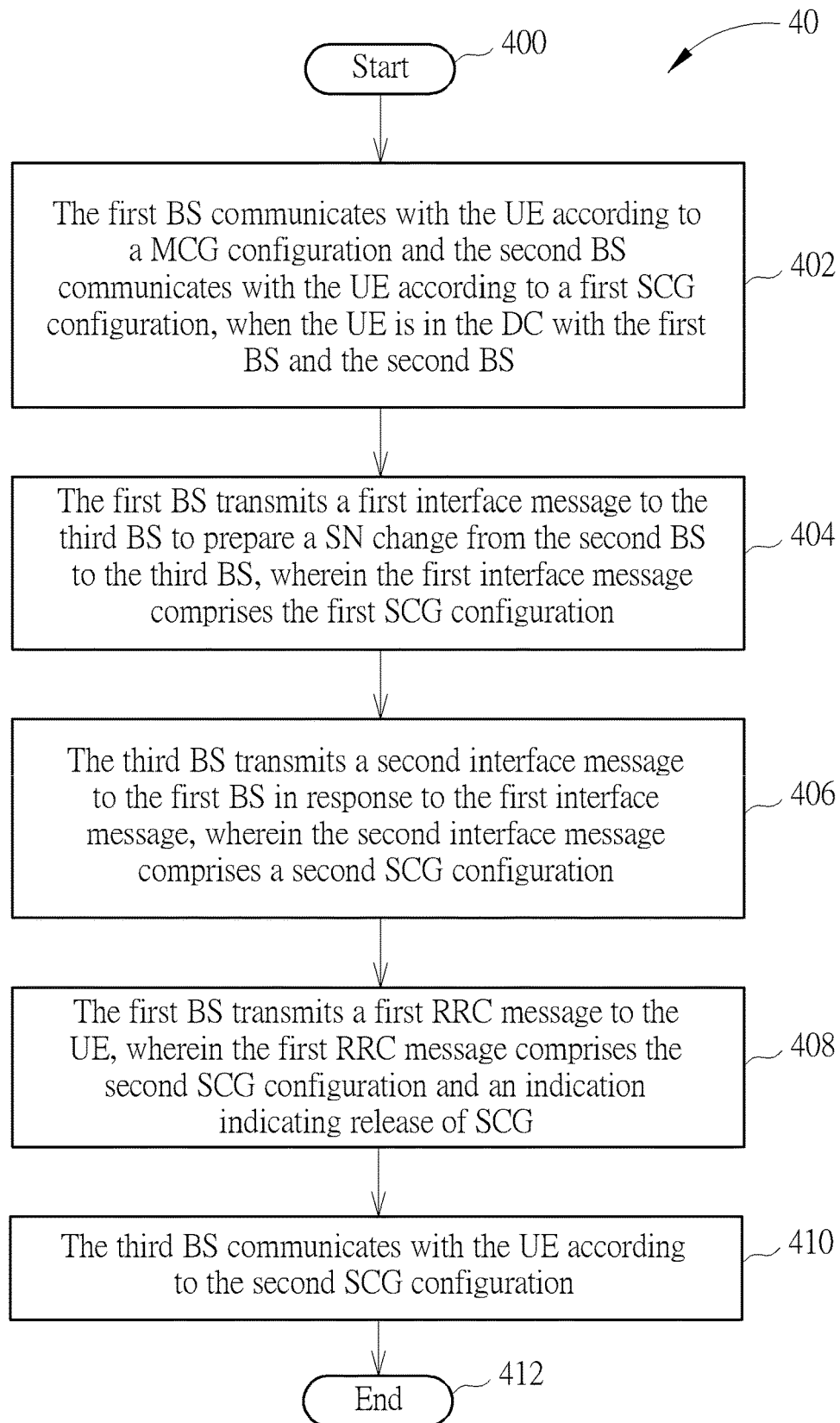
FIG. 4 is a flowchart of a process according to an example of the present invention.

A process 40 in FIG. 4 may be utilized in a network including a first BS (e.g., the BS 102), a second BS (e.g., the BS 104) and a third BS, and includes the following steps:

Step 400: Start.

Step 402: The first BS communicates with a UE according to (e.g., using) a MCG configuration and the second BS communicates with the UE according to a first SCG configuration, when the UE is in the DC with the first BS and the second BS.

Step 404: The first BS transmits a first interface message to the third BS to prepare a SN change from the second BS to the third BS, wherein the first interface message comprises the first SCG configuration.

Step 406: The third BS transmits a second interface message to the first BS in response to the first interface message, wherein the second interface message comprises a second SCG configuration.

Step 408: The first BS transmits a first RRC message to the UE, wherein the first RRC message comprises the second SCG configuration and an indication indicating release of SCG (e.g., SCG release or SN release).

Step 410: The third BS communicates with the UE according to the second SCG configuration.

Step 412: End.

According to the process 40, the third BS communicates with the UE according to the second SCG configuration instead of the first SCG configuration.

In one example, the second interface message includes an information element (IE) causing the first BS to include the indication. In one example, the third BS determines to include the IE in the second interface message, when the third BS cannot recognize/understand/comprehend a configuration in the first SCG configuration. For example, the configuration is added in a version of a 3GPP specification later than a version of the 3GPP specification implemented by the third BS, such that the third BS does not recognize/understand the configuration. In one example, the third BS determines to include the IE in the second interface message irrespective of the first SCG configuration since the third BS does not check (e.g., read, look at or refer to) the first SCG configuration. For example, the IE is a cause IE or a specific IE which indicates the release of SCG or a full configuration.

In one example, the second interface message does not include the IE causing the first BS to include the indication. The second interface message itself may indicate or imply the release of SCG (i.e., the second SCG configuration has no dependency on the first SCG configuration). The first BS knows that the second SCG configuration is a full configuration irrelevant to the first SCG configuration, since the third BS is configured to use a full configuration for the second SCG configuration (i.e., not reusing any configuration in the first SCG configuration) instead of using the delta configuration (i.e., reusing one or more configurations in the first SCG configuration). The first BS includes the indication according to/in response to the second interface message not including the IE.

In one example, the second interface message may not include an IE causing the first BS not to include the indication. That is, the second interface message itself may indicate or imply the first BS does not indicate the release of SCG (i.e., the second SCG configuration has dependency on the first SCG configuration). The first BS knows that the second SCG configuration is a delta configuration dependent on the first SCG configuration according to the second interface message not including the IE. The first BS does not include the indication in the first RRC message according to/in response to the second interface message not including the IE.

In another example, the first interface message may include the first SCG configuration, and the second interface message may include an IE causing the first BS not to include the indication. The second BS comprehends the first SCG configuration, and generates the second SCG configuration according to the first SCG configuration. That is, the IE indicates that the second SCG configuration has dependency on the first SCG configuration, i.e., the second SCG configuration includes delta configuration(s) from the first SCG configuration. Thus, the first BS knows that the second SCG configuration is a delta configuration on top of the first SCG configuration according to the second interface message including the IE. The first BS does not include the indication in the first RRC message according to/in response to the second interface message including the IE. For example, the IE indicates that the delta configuration(s) is used for the second SCG configuration.

In one example, the first interface message includes the MCG configuration or a part of the MCG configuration. The first interface message may include the UE's capability. The third BS may determine (content of) the second SCG configuration according to the MCG configuration or the part of the MCG configuration.

In one example, the first interface message is a SN Addition Request message, and the second interface message is a SN Addition Request Acknowledge message. The term of "SN" may be replaced by "secondary evolved Node-B (SeNB)" or "secondary next generation Node-B (SgNB)".

In one example, the first BS transmits a third interface message to the second BS to release the second BS for the UE, in response to the second interface message. In one example, the third interface message is a SN Release Request message (or called a SN Change Confirm message).

In one example, when the UE receives the first RRC message, the UE releases (ignores or discards) the first SCG configuration (e.g., the first SCG configuration is no longer valid) according to the indication, and uses the second SCG configuration to communicate with the third BS. Thus, the UE is in the DC with the first BS and the third BS in response to the first RRC message.

The examples described for the process 30 may be applied to the process 40, and are not repeated herein.

Figure 5:
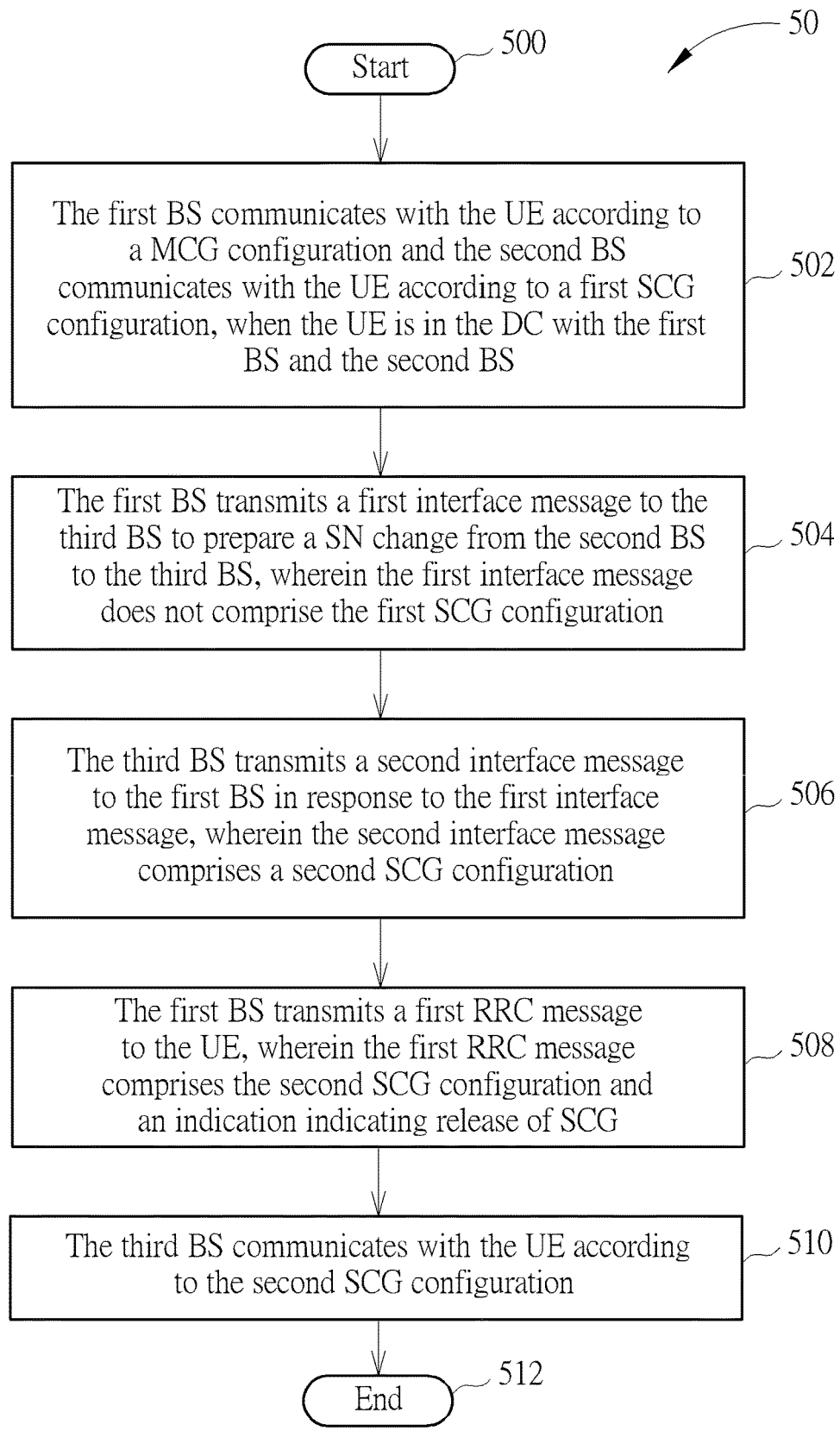
FIG. 5 is a flowchart of a process according to an example of the present invention.

A process 50 in FIG. 5 may be utilized in a network including a first BS (e.g., the BS 102), a second BS (e.g., the BS 104) and a third BS, and includes the following steps:

Step 500: Start.

Step 502: The first BS communicates with a UE according to (e.g., using) a MCG configuration and the second BS communicates with the UE according to a first SCG configuration, when the UE is in the DC with the first BS and the second BS.

Step 504: The first BS transmits a first interface message to the third BS to prepare a SN change from the second BS to the third BS, wherein the first interface message does not comprise the first SCG configuration.

Step 506: The third BS transmits a second interface message to the first BS in response to the first interface message, wherein the second interface message comprises a second SCG configuration.

Step 508: The first BS transmits a first RRC message to the UE, wherein the first RRC message comprises the second SCG configuration and an indication indicating release of SCG (e.g., SCG release or SN release).

Step 510: The third BS communicates with the UE according to the second SCG configuration.

Step 512: End.

An advantage of the process 50 is that the first BS does not transmit the first SCG configuration to the third BS to save resources in a connection between the first BS and the third BS. The description for the processes 30-40 may be applied to the process 50. The UE communicates with the third BS according to the second SCG configuration. Thus, the UE is in the DC with the first BS and the third BS in response to the first RRC message.

Figure 6:
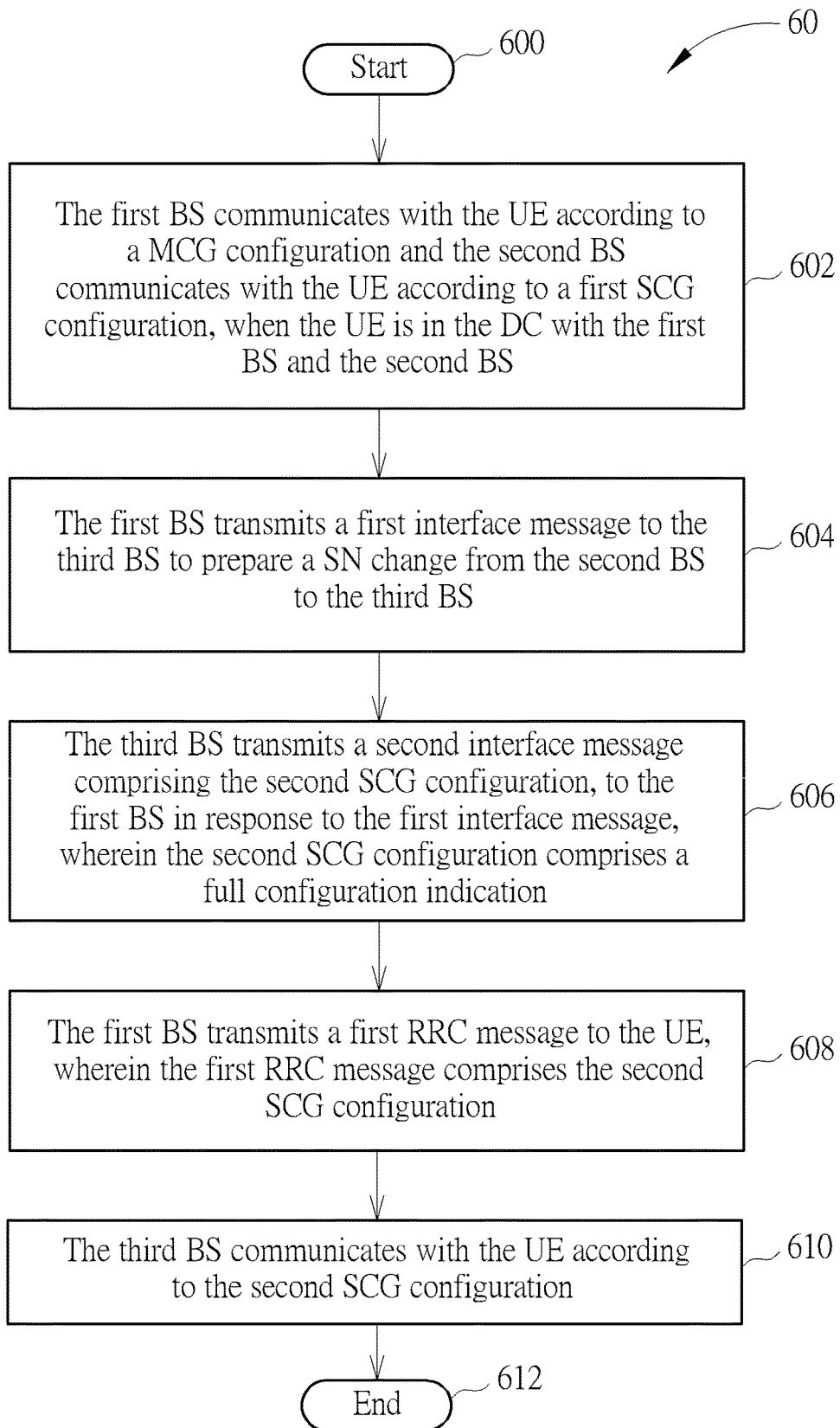
FIG. 6 is a flowchart of a process according to an example of the present invention.

A process 60 in FIG. 6 may be utilized in a first BS (e.g., the BS 102), a second BS (e.g., the BS 104) and a third BS, and includes the following steps:

Step 600: Start.

Step 602: The first BS communicates with a UE according to (e.g., using) a MCG configuration and the second BS communicates with the UE according to a first SCG configuration, when the UE is in the DC with the first BS and the second BS.

Step 604: The first BS transmits a first interface message to the third BS to prepare a SN change from the second BS to the third BS.

Step 606: The third BS transmits a second interface message comprising the second SCG configuration, to the first BS in response to the first interface message, wherein the second SCG configuration comprises a full configuration indication.

Step 608: The first BS transmits a first RRC message to the UE, wherein the first RRC message comprises the second SCG configuration.

Step 610: The third BS communicates with the UE according to the second SCG configuration.

Step 612: End.

In one example, the first interface message comprises the first SCG configuration. Alternatively, the first interface message does not comprise the first SCG configuration. An advantage for not including the first SCG configuration in the first interface message is that the second BS does not need to support the delta configuration.

Figure 7:
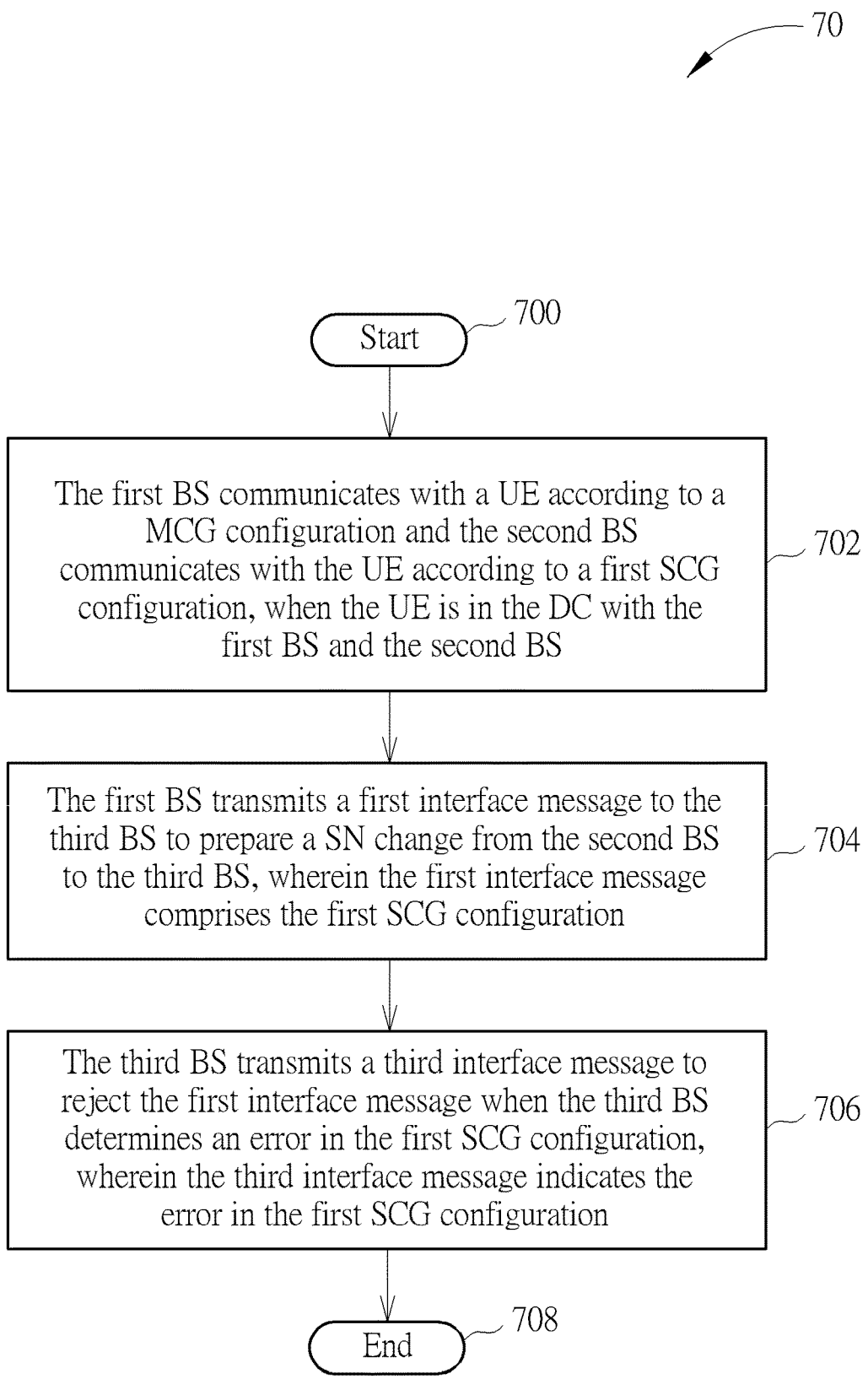
FIG. 7 is a flowchart of a process according to an example of the present invention.

A process 70 in FIG. 7 may be utilized in a first BS (e.g., the BS 102), a second BS (e.g., the BS 104) and third BS, and includes the following steps:

Step 700: Start.

Step 702: The first BS communicates with a UE according to (e.g., using) a MCG configuration and the second BS communicates with the UE according to a first SCG configuration, when the UE is in the DC with the first BS and the second BS.

Step 704: The first BS transmits a first interface message to the third BS to prepare a SN change from the second BS to the third BS, wherein the first interface message comprises the first SCG configuration.

Step 706: The third BS transmits a third interface message to reject the first interface message when the third BS determines an error in the first SCG configuration, wherein the third interface message indicates the error in the first SCG configuration.

Step 708: End.

The description for the processes 30-50 may be applied to the processes 60-70. The following examples may be applied to the processes 30-70.

In one example, the first BS configures the MCG configuration to the UE via a RRC connection (e.g., SRB) between the UE and the first BS. In one example, the second BS configures the first SCG configuration to the UE via the first BS and the RRC connection. In one example, the second BS configures a part of the first SCG configuration via the first BS and the RRC connection, and configures the other part of the first SCG configuration via a SRB between the UE and the second BS.

In one example, the second BS and the third BS are a same BS. In one example of this case, the first BS may transmit the first interface message to request a modification of the first SCG configuration. The first interface message may be a SN Modification Request, and the second interface message may be a SN Modification Request Acknowledge. The first BS may transmit the first interface message, when the first BS determines to request the modification of the first SCG configuration. In one example, the first BS determines to request the modification of the first SCG configuration due to a change of the MCG configuration. In one example, the first BS determines to request the modification of the first SCG configuration due to an addition or release of SCG SCell(s), due to an addition, modification or release of SCG bearer(s), SCG split bearer(s) and the SCG part of split bearer(s), or due to triggering a PSCell change. In one example, the second BS transmits a fourth interface message to the first BS to request the first BS to transmit the first interface message. The fourth interface message may be a SN Modification Required message. The second BS may transmit the fourth interface message, when the second BS detects a system failure or an error on the UE's transmission.

In one example, the second BS and the third BS may be different BSs.

In one example, the UE transmits the first RRC response message in response to the first RRC message.

In one example, the third BS includes the second SCG configuration in a second RRC message, and includes the second RRC message in the second interface message. Then, the first BS may include the second RRC message in the first RRC message so that the first RRC message includes the second SCG configuration. The first RRC response message may include a second RRC response message responding the second RRC message. The first BS may transmit the second RRC response message to the third BS. The DRB configuration(s) may be included in the first RRC message instead of the second SCG configuration or the second RRC message.

In one example, the first RRC message and the first RRC response message may be long-term evolution (LTE) RRC messages. For example, the first RRC message is a LTE RRC Connection Reconfiguration message, and the first RRC response message is a LTE RRC Connection Reconfiguration message. In one example, the second RRC message and the second RRC response message may be new radio (NR) RRC messages. For example, the second RRC message is a NR RRC (Connection) Reconfiguration message, and the second RRC response message is a NR RRC (Connection) Reconfiguration message.

In one example, the first RRC message and the first RRC response message are NR RRC messages. For example, the first RRC message is a NR RRC (Connection) Reconfiguration message, and the first RRC response message may be a NR RRC (Connection) Reconfiguration message. In one example, the second RRC message and the second RRC response message are LTE RRC messages. For example, the second RRC message is a LTE RRC Connection Reconfiguration message, and the second RRC response message is a LTE RRC Connection Reconfiguration message.

In one example, the indication does not impact the MCG configuration. That is, the UE does not release, change or update the MCG configuration in response to the indication.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned steps, description and examples. Some steps described above may not necessarily have to be used in the invention. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above may be compiled into the program codes 214. For the process involving the first, second and/or third BSs, steps performed by the first BS may be compiled into the program codes 214 of the first BS, steps performed by the second BS may be compiled into the program codes 214 of the second BS and steps performed by the third BS may be compiled into the program codes 214 of the third BS.

To sum up, the present invention provides a method and related base station for efficiently handling simultaneous communications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A first base station (BS), comprising:
   at least one storage device; and
   at least one processing circuit, coupled to the at least one storage device, wherein the at least one storage device stores, and the at least one processing circuit is configured to execute instructions of:
   the first BS receiving a first interface message for a communication device from a second BS;
   the first BS transmitting a second interface message to the second BS in response to the first interface message, wherein the second interface message comprises a secondary cell group (SCG) configuration and an information element (IE) causing the first BS to comprise an indication indicating release of SCG in a radio resource control (RRC) message; and
   the first BS transmitting the RRC message to the communication device, wherein the RRC message comprises the SCG configuration and the indication.

2. The first BS of claim 1, wherein the first BS does not comprise the indication in the RRC message, when the second interface message does not comprise the IE.

3. The first BS of claim 1, wherein the first interface message includes a master cell group (MCG) configuration for the communication device or a part of the MCG configuration.

4. The first BS of claim 1, wherein the first interface message comprises another SCG configuration.

5. A method for a first base station (BS), comprising:
   the first BS receiving a first interface message for a communication device from a second BS;
   the first BS transmitting a second interface message to the second BS in response to the first interface message, wherein the second interface message comprises a secondary cell group (SCG) configuration and an information element (IE) causing the first BS to comprise an indication indicating release of SCG in a radio resource control (RRC) message; and
   the first BS transmitting the RRC message to the communication device, wherein the RRC message comprises the SCG configuration and the indication.

6. The method of claim 5, wherein the first BS does not comprise the indication in the RRC message, when the second interface message does not comprise the IE.

7. The method of claim 5, wherein the first interface message includes a master cell group (MCG) configuration for the communication device or a part of the MCG configuration.

8. The method of claim 5, wherein the first interface message comprises another SCG configuration.

* * * * *